(12) United States Patent
Donoho

(10) Patent No.: US 8,689,497 B2
(45) Date of Patent: Apr. 8, 2014

(54) ADJUSTABLE BIRD SLOPE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

(21) Appl. No.: 14/045,664

(22) Filed: Oct. 3, 2013

(65) Prior Publication Data

US 2014/0033623 A1 Feb. 6, 2014

Related U.S. Application Data

(62) Division of application No. 11/085,965, filed on Mar. 21, 2005.

(51) Int. Cl.
 *A01M 29/32* (2011.01)
 *E04B 1/72* (2006.01)
 *A01K 15/00* (2006.01)

(52) U.S. Cl.
 USPC .............. 52/101; 52/98; 52/288.1; 52/717.05

(58) Field of Classification Search
 USPC .................. 52/57, 58, 94–96, 98, 101, 288.1, 52/716.1, 717.05
 See application file for complete search history.

(56) References Cited

U.S. PATENT DOCUMENTS

| | | |
|---|---|---|
| 669,148 A | 3/1901 | Smith |
| 1,026,406 A | 5/1912 | Nichols |
| 1,250,594 A | 12/1917 | Knapp |
| 2,131,844 A | 10/1938 | Mooshian |
| 2,922,385 A | 1/1960 | Murray |
| 3,344,569 A | 10/1967 | Cotten |
| 3,626,906 A | 12/1971 | Voran et al. |
| 4,008,549 A | 2/1977 | Dobija |
| 4,052,830 A | 10/1977 | Smith |
| 4,091,586 A | 5/1978 | Schwartz |
| 4,214,510 A | 7/1980 | Ward |
| 4,319,528 A | 3/1982 | Gutridge et al. |
| 4,660,333 A | 4/1987 | Romer |
| 4,660,463 A | 4/1987 | Bottomore et al. |
| 4,773,173 A | 9/1988 | Christian |
| 4,829,730 A | 5/1989 | Zeilinger |
| 4,837,991 A | 6/1989 | Shaw |
| 5,199,232 A | 4/1993 | Chandler et al. |
| 5,303,523 A | 4/1994 | Hand et al. |
| 5,406,758 A | 4/1995 | Baum |
| 5,487,199 A | 1/1996 | Nelson |
| 5,501,044 A | 3/1996 | Janesky |
| 5,630,297 A | 5/1997 | Rutherford |
| 5,913,780 A | 6/1999 | Goergen |
| 5,941,028 A | 8/1999 | Hicks |
| 6,115,982 A | 9/2000 | Lindenberg |
| 6,131,348 A | 10/2000 | Dunham |
| 6,243,995 B1 | 6/2001 | Reeves et al. |
| 6,546,676 B2 | 4/2003 | Wiesener et al. |
| 6,591,559 B2 | 7/2003 | Contreras et al. |
| 6,625,925 B1 | 9/2003 | Foster |
| 6,643,990 B2 | 11/2003 | Jensen |
| 6,848,220 B2 | 2/2005 | Faurholdt et al. |
| 6,941,706 B2 | 9/2005 | Austin et al. |

(Continued)

*Primary Examiner* — Adriana Figueroa

(74) *Attorney, Agent, or Firm* — Fish & Tsang LLP

(57) ABSTRACT

An adjustable bird slope has a face that can be extended or contracted so that the bird slope can effectively fit almost any perching area.

15 Claims, 2 Drawing Sheets

(56) References Cited

U.S. PATENT DOCUMENTS

| | | |
|---|---|---|
| 7,200,970 B2 | 4/2007 | Koenig, Jr. et al. |
| 2002/0073633 A1 | 6/2002 | Schlichting et al. |
| 2002/0139060 A1 | 10/2002 | Contreras et al. |
| 2002/0157325 A1 | 10/2002 | Domanico |
| 2003/0029125 A1 | 2/2003 | Salice |
| 2004/0194423 A1 | 10/2004 | Payne |
| 2005/0166527 A1 | 8/2005 | Ernest et al. |
| 2008/0110106 A1 | 5/2008 | Holly |

# ADJUSTABLE BIRD SLOPE

This application is a divisional of U.S. patent application Ser. No. 11/085,965, filed on Mar. 21, 2005. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is bird deterrent devices.

BACKGROUND OF THE INVENTION

Some bird deterrents rely on a sloped surface to deter birds from alighting. In such instances the deterring aspect of the device is usually based on a combination of the degree of slope of the surface and the texture of the surface. One such device is taught in U.S. Pat. No. 3,626,906 to Voran et al. The '906 patent describes an egg guard for a poultry cage, which is sloped so that a bird would slide off it.

Another bird deterrent with a sloped surface is described in U.S. Publication No. 2002/0073633. That publication actually describes birds sliding off of the surface. U.S. Publication No. 2004/0194423 describes still other sloped devices.

All of these devices suffer from dimensional limitations; a bird must land on the sloped surface in order to be deterred. If the device is too small to cover the entire perching area, a bird will simply land along side of it. Consider, for example, a ledge of a building where birds are likely to perch. Such ledges can range considerably in size. A sloped bird deterrent that covers less than the entire space of the ledge is virtually worthless since birds can perch on the portion of the ledge that is not covered by the slope. At the same time, a sloped bird deterrent that is too large for a particular perch can be unsteady or at least will be aesthetically unpleasing.

The wide range of possible deployment surfaces and shapes creates considerable problem in manufacturing and distribution of sloped bird deterrent products. Thus, there is a need for a sloped bird deterrent that can be adjusted to fit a variety of different sized areas.

SUMMARY OF THE INVENTION

The present invention provides methods and apparatus in which an improved bird slider can be adjusted to fit the size of a perching area. The improvement comprises at least one extendible member that alters an effective height of a laterally elongated face of the slider.

In another aspect, a bird deterrent generally comprises a base, a support member coupled to the base, a laterally elongated face, and an extendible member. The laterally elongated face is coupled to the support member such that the face is angled between 20 to 80 degrees relative to horizontal. The extendible member extends from the elongated face and alters an effective height of the face.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
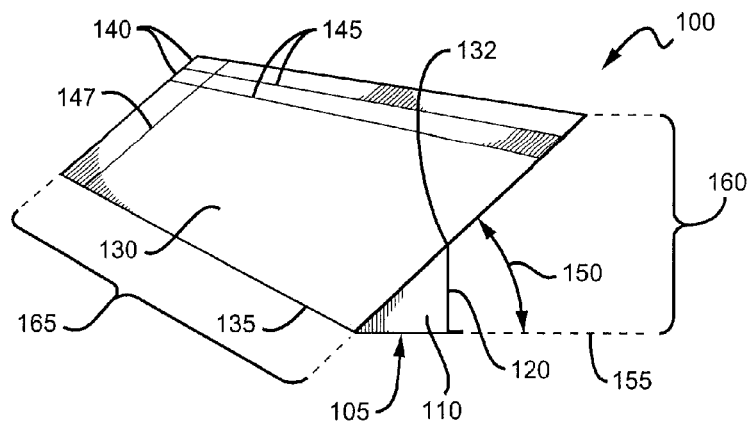
FIG. 1 is a perspective view of a bird deterrent with an extendible face.

Referring first to FIG. 1, a bird deterrent 100 generally comprises a base 105, a support member 120, a laterally elongated face 130, and extendible members 140.

Base 110 has a bottom 105 that is configured to rest on a ledge or other perch. It is preferred that the length of the bottom be long enough so that the deterrent is steady on the perch yet not be so long that it extends beyond the surface of the perch. A preferable bottom is therefore adjustable in its length. Such adjustments can be accomplished using various techniques that can include providing a hinged bottom that can be folded or unfolded or a telescoped bottom that can be extended or contracted. It-should be appreciated that the bottom of the base can be coupled to the face or it can be formed from the face, for example, by a bend in the face.

Support 120 is coupled to face 130 at point 132 and at hinge line 135. In each case, the support can be either permanently or removeably coupled to the face by bolts, solder, hinges, pins, or other coupling means. Moreover, at point 132, face 130 can simply rest upon support 120. In a preferred class of embodiments, the support is sized, and the bottom is angled, such that the angle 150 between the face 130 and horizontal 155 (i.e. a plane that is substantially parallel to the 10 ground beneath the deterrent) is between 20 degrees and 80 degrees. This angle should be sufficient so that birds will slide off of the face. As such, the angle can vary depending upon the material used on the surface of the face. If the material of the face results in relatively little friction (e.g. Teflon™), the angle can not have to be as severe as when a less slippery material is used. It is contemplated that angle 150 can be adjustable based on the length of the support 120. By extending the support, one can create a greater angle and vice versa.

It is further contemplated that the length of the support can be used to adjust the angle of the base bottom 110 relative to horizontal 155. In order that the base bottom 110 be adjustable relative to horizontal 155, it is preferred that base bottom 110 be hingedly coupled to face 130. It should be recognized that it is advantageous for the angle of the bottom to approximate the angle of the perch so as to attain a better fit and more stability.

Face 130 is substantially planar and is generally comprised of a material (e.g. a synthetic polymer, Teflon™, and so on) that has a smooth texture. A face is typically elongated laterally (e.g. extending the length of a ledge), but in certain cases its extended length 160 is greater than its lateral length 165. In any case, the extended length of the face is customizable to the area upon which the bird deterrent will be placed. In addition, it is further contemplated that a bird deterrent can be constructed such that it can extend and contract laterally too in order to fit the length of particular perching areas. In that respect, face 130 can be scored in the direction of the slope as along line 147.

Figure 4:
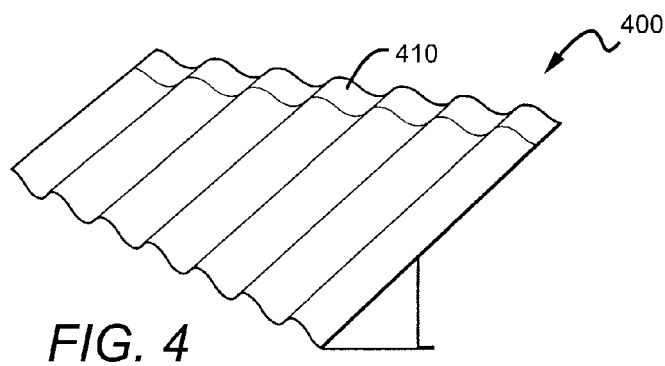
FIG. 4 is a perspective view of corrugated extended face of a bird deterrent.

FIG. 4 depicts an alternative face of a bird deterrent. The bird deterrent 400 has waves 410 which provide a corrugated effect. It can be observed that the waves are elongated in the direction of the slope so that they do not aid a bird in alighting on the bird deterrent.

Extendible members 140 are coupled to face 130 and effectively alter the height (or extended length) 160 of the face 130. As can be observed, the height of the face is the distance between the top of the deterrent and the bottom 105 of the base. The effective height of the face can vary considerably, however, it is preferred that the face be capable of extending at least 0.5 m. Not only can the height of the face be effectively extended, but it can also be effectively shortened by removal of an extendible portion. In order to provide for easy removal of extendible portions, face 130 has laterally extending scores 145. By having a scored (i.e. perforated) breakaway, extendible portions can be easily removed thereby facilitating customization of the deterrent to a particular perching area.

Figure 2A:
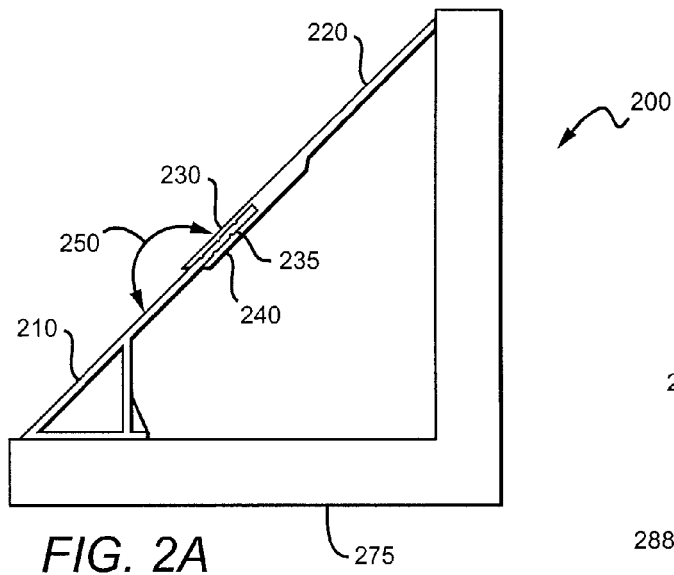
FIG. 2A is a side view of an alternative bird deterrent with an extendible face.

Turning your attention now to FIG. 2A, bird deterrent 200 resting upon a ledge 275 has an extendible member 220 that is coupled to the face 210 using a grooved connection comprised of an upper edge 230 and a lower edge 240 of the extendible member 220. Face 210 has a top portion 235 which is received within the groove. Many other grooved embodiments are contemplated including those in which the face forms the groove as opposed to the extendible member. It should also be recognized that although the embodiment depicted in FIG. 2A shows only one extendible member, there can be additional extendible members coupled in sequence.

It is preferred that the face of a bird deterrent be substantially contiguous. In that respect, an angle between the face and the extendible member 250 will probably not exceed 10°. In less preferred embodiments, the angle can exceed 10°, however, so long as the device remains effective.

Figure 2B:
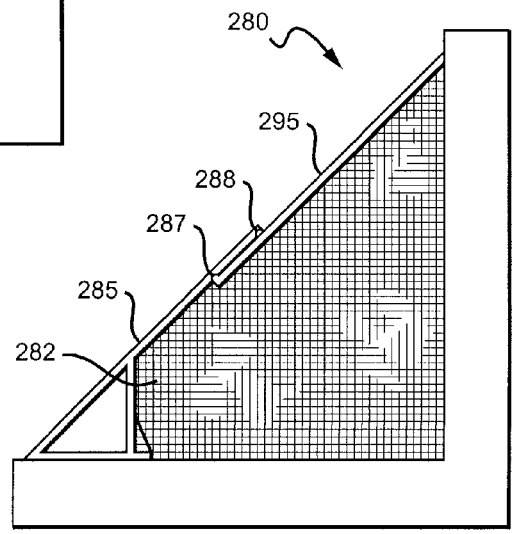
FIG. 2B is a side view of an alternative bird deterrent with an extendible face.

In FIG. 2B, a bird deterrent 280 has an extendible member 295 that is coupled to a face 285 using a telescoping connection. The telescoping connection basically allows effective extension and compression of the face. It can be observed that there can be a tongue 287 and groove 288 or other type of arrangement that provides for a stopping point for extension of the telescoping members.

FIG. 2B also shows netting 282 which is coupled to the bird deterrent so that birds do not nest underneath the bird deterrent. Of course, the ends of the bird deterrent can be sealed using other materials and methods so long as they prevent birds (and even other animals) from getting underneath the deterrent.

Figure 3A:
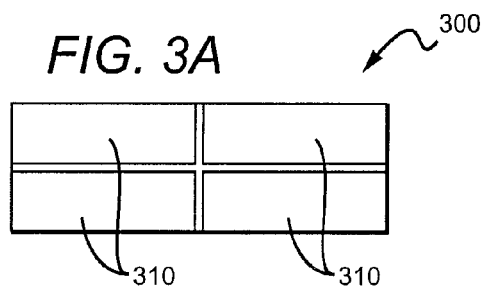
FIG. 3A is a base of a bird deterrent.
Figure 3B:
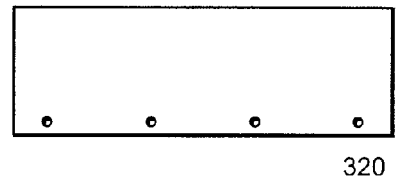
FIG. 3B is an alternative base of a bird deterrent.

FIG. 3A shows the base 300 of a bird deterrent with glue troughs 310. The glue troughs are used to couple the bird deterrent to a ledge or other perching area. While coupling of the base is not an absolute necessity, it is preferred since it tends to stabilize the device. One of skill in the art will appreciate that a bird deterrent can be coupled to a building in a variety of ways. An alternative embodiment is shown in FIG. 3B. In this embodiment, the base is provided with screw holes 320 so that the base can be easily screwed or bolted in place.

Figure 5:
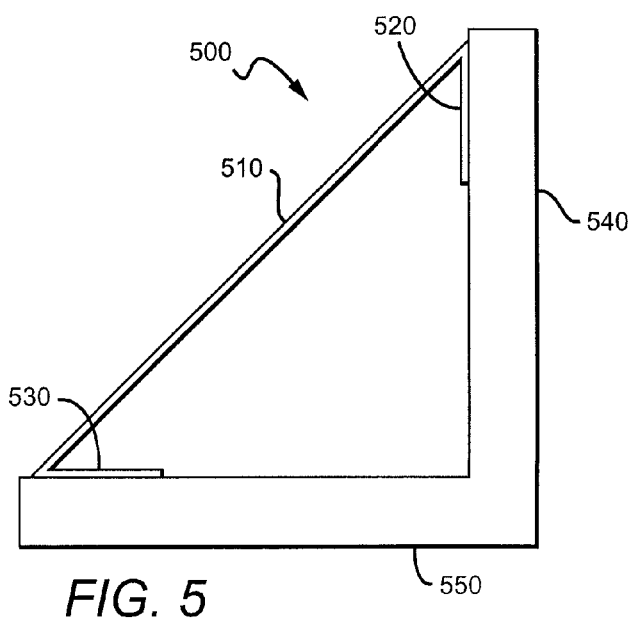
FIG. 5 is a side view of an alternative bird deterrent.

FIG. 5 shows an alternative bird deterrent in which the face 510 is supported by two bases 520 and 530 in contact with a building wall 540 and a ledge 550. Each of the bases are coupled to, or formed from, the face. The first base 520 preferably rests against a vertical wall 540 of a building and the second base 530 preferably rests upon a horizontal ledge 550 of a building. It should be appreciated that the bases can have means for coupling to the building and ledge (e.g. glue trough, screw holes, Velcro™, and so on) and such coupling is preferred since this embodiment is not supported on its own, but only through contact with the building wall and the ledge.

Thus, specific embodiments and applications of a sloped bird deterrent have been 20 disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced.

The invention claimed is:

1. A bird slider device configured such that a bird landing on the device will slide and be unable to perch, the device comprising:
   a support member coupled to a base and a laterally elongated face, wherein the support member extends between the base and the face;
   a removable portion that alters an effective height of the face, wherein the a removable portion comprises a groove that is configured to receive a lip of the face;
   wherein the removable portion and the face are substantially planar; and
   wherein the face is angled between 20 to 80 degrees relative to the base when the base is horizontal.

2. The bird slider device of claim 1, wherein the base, the support member and the face are configured such that the face overlies both the base and the support member when the base is horizontal.

3. The bird slider device of claim 1, wherein the base is adapted to be coupled to a ledge.

4. The bird slider device of claim 1, wherein the removable portion extends at least 0.5 m.

5. The bird slider device of claim 1, wherein the face is comprised of a synthetic polymer.

6. The bird slider device of claim 1, wherein the support member is hingedly coupled to the face.

7. The bird slider device of claim 1, wherein the face has a smooth texture.

8. The bird slider device of claim 1, wherein the removable portion comprises laterally extending scores.

9. An improved bird slider for installation on a building that is configured such that a bird landing on the slider will slide off, the slider having a base, a support member coupled to the base, and a laterally elongated face coupled to the support member, the improvement comprising a removable portion that alters an effective height of the face, wherein the base, the support member and the face are configured such that the face overlies both the base and the support member when the base is horizontal, wherein the support member extends between the base and the face, wherein the removable portion and the face form a substantially contiguous surface, wherein the face and the removable portion are angled between 20 and 80 degrees relative to the base, and wherein the removable portion comprises a groove that is configured to receive a lip of the face.

10. The bird slider of claim 9, wherein the base is adapted to be coupled to a ledge.

11. The bird slider of claim 9, wherein the removable portion extends at least 0.5 m.

12. The bird slider of claim 9, wherein the face is comprised of a synthetic polymer.

13. The bird slider of claim 9, wherein the support member is hingedly coupled to the face.

14. The bird slider of claim 9, wherein the face has a smooth texture.

15. The bird slider of claim 9, wherein the removable portion comprises laterally extending scores.

* * * * *